(12) United States Patent
Pulini et al.

(10) Patent No.: US 8,756,412 B2
(45) Date of Patent: Jun. 17, 2014

(54) GATEWAY SUPPORTING TRANSPARENT REDUNDANCY IN PROCESS CONTROL SYSTEMS AND OTHER SYSTEMS AND RELATED METHOD

(75) Inventors: Christopher Pulini, Conshohocken, PA (US); Norman R. Swanson, Douglassville, PA (US); Alexander Chernoguzov, Warrington, PA (US); Niral B. Sanghavi, Lansdale, PA (US); Channabasavaraj Raravi, Hospet (IN); Karthikeya S. Ramanathan, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 288 days.

(21) Appl. No.: 12/762,215

(22) Filed: Apr. 16, 2010

(65) Prior Publication Data

US 2011/0258433 A1 Oct. 20, 2011

(51) Int. Cl.
*H04L 29/06* (2006.01)
*G06F 15/16* (2006.01)
*G06F 17/30* (2006.01)
*G06F 17/00* (2006.01)
*G01R 31/08* (2006.01)
*G08C 15/00* (2006.01)
*H04L 1/00* (2006.01)

(52) U.S. Cl.
USPC ............. 713/153; 726/3; 726/11; 370/218; 370/401

(58) Field of Classification Search
USPC ............. 370/217–228; 709/248; 713/153; 455/436–444
See application file for complete search history.

(56) References Cited

U.S. PATENT DOCUMENTS

| 6,437,692 | B1 | 8/2002 | Petite et al. |
| 6,847,316 | B1 | 1/2005 | Keller |
| 2002/0120671 | A1 | 8/2002 | Daffner et al. |
| 2002/0122230 | A1 | 9/2002 | Izadpanah et al. |
| 2004/0230899 | A1 | 11/2004 | Pagnano et al. |
| 2004/0259533 | A1 | 12/2004 | Nixon et al. |

(Continued)

FOREIGN PATENT DOCUMENTS

| DE | 103 14 721 A1 | 11/2004 |
| EP | 1 401 171 A2 | 3/2004 |

(Continued)

OTHER PUBLICATIONS

A. Aiello et al., "Wireless Distributed Measurement System by Using Mobile Devices," IEEE Workshop on Intelligent Data Acquisition and Advanced Computing Systems: Technology and Applications, Sep. 5-7, 2005, Sofia, Bulgaria, pp. 316-319.

(Continued)

*Primary Examiner* — Evans Desrosiers

(57) ABSTRACT

A method includes synchronizing a first gateway with information from a second gateway. The second gateway operates in a primary role with at least one primary network address. The second gateway communicates with at least one wireless device that uses at least one encryption key during at least one secure communication session. The information includes the at least one encryption key. The method also includes detecting a switchover event at the first gateway. The method further includes, in response to detecting the switchover event, switching the first gateway to the primary role, communicating using the at least one primary network address, and maintaining the at least one secure communication session at the first gateway after the first gateway switches to the primary role.

22 Claims, 10 Drawing Sheets

(56) References Cited

U.S. PATENT DOCUMENTS

| | | | |
|---|---|---|---|
| 2005/0059379 A1 | 3/2005 | Sovio et al. | |
| 2005/0141553 A1 | 6/2005 | Kim et al. | |
| 2005/0228509 A1 | 10/2005 | James | |
| 2007/0073861 A1 | 3/2007 | Amanuddin et al. | |
| 2007/0153677 A1 | 7/2007 | McLaughlin et al. | |
| 2007/0237137 A1 | 10/2007 | McLaughlin | |
| 2007/0280178 A1 | 12/2007 | Hodson et al. | |
| 2008/0074993 A1* | 3/2008 | Vainola | 370/218 |
| 2009/0037998 A1* | 2/2009 | Adhya et al. | 726/11 |
| 2009/0060192 A1 | 3/2009 | Budampati et al. | |
| 2010/0070634 A1* | 3/2010 | Ranjan et al. | 709/228 |

FOREIGN PATENT DOCUMENTS

| | | |
|---|---|---|
| GB | 2 427 329 A | 12/2006 |
| WO | WO 01/35190 A2 | 5/2001 |
| WO | WO 01/35190 A3 | 5/2001 |
| WO | WO 03/079616 A1 | 9/2003 |
| WO | WO 2004/047385 A2 | 6/2004 |
| WO | WO 2006/017994 A1 | 2/2006 |
| WO | WO 2006/053041 A1 | 5/2006 |

OTHER PUBLICATIONS

International Search Report and Written Opinion of the International Searching Authority in PCT Application No. PCT/US2007/069717 dated Dec. 10, 2007.

International Search Report and Written Opinion of the International Searching Authority in PCT Application No. PCT/US2007/069614 dated Nov. 22, 2007.

International Search Report and Written Opinion of the International Searching Authority in PCT Application No. PCT/US2007/069710 dated Nov. 27, 2007.

International Search Report and Written Opinion of the International Searching Authority in PCT Application No. PCT/US2007/069705 dated Apr. 15, 2008.

Pereira, J.M. Dias, "A Fieldbus Prototype for Educational Purposes", IEEE Instrumentation & Measurement Magazine, New York, NY vol. 7, No. 1, Mar. 2004, p. 24-31.

\* cited by examiner

FIG. 11

SYSTEM:WSG Block, WSG_101 - Parameters [Offline]

Main | Redundancy | Statistics | Modbus TCP Server | Modbus TCP Registers | HART | Identification ← 1102

1100

Tag Name: WSG_101

Ethernal IP Address: 192 . 168 . 4 . 223 ← 1104

Wireless Gateway Command: None ▼ ← 1106

Application Image Version:

State Information
Wireless Gateway State: Down
Redundancy Role: UNDEFINED
Synchronization State: ---

Advanced Options
Communication Timeout Retries: 3   1108
*Reset Device Drop Off Counter*
☑ Default Wireless Gateway
☐ Modbus TCP Interface Enabled
☐ HART Interface Enabled
☐ Enraf Protocol Tunnel Interface Enabled   1112

Redundancy Configuration ─ 1110
☑ Module is redundant
Secondary Tag Name: WSG_101SEC
Partner Ethernet IP Address: 192 . 168 . 4 . 224

Wireless Sensor Network
Gateway Network Address: 61441
Wireless Field Network ID: 0
Frequency Group: US Channel #1
Frequency Hopping Pattern: 0
Radio Type: ---
⊗ *Wireless Sensor Communication Unavailable*   1114

☐ Show Parameter Names        OK    Cancel    Help

GATEWAY SUPPORTING TRANSPARENT REDUNDANCY IN PROCESS CONTROL SYSTEMS AND OTHER SYSTEMS AND RELATED METHOD

TECHNICAL FIELD

This disclosure relates generally to wireless communication systems. More specifically, this disclosure relates to a gateway supporting transparent redundancy in process control systems and other systems and related method.

BACKGROUND

In industrial process control systems, wireless networks have been widely deployed to support sensing and control of industrial processes. These wireless networks often allow the industrial processes to be monitored using wireless sensors. These wireless networks also often allow adjustments to be made to the industrial processes using wireless actuators.

The use of wireless networks typically helps to reduce or avoid the costs usually associated with wired devices. These costs can include the expenses necessary to lay down and maintain power and communication lines to the wired devices. However, wireless networks are often less robust that wired networks. Interruptions in wireless communications can occur for various reasons, such as hardware or software faults in network components. These interruptions can cause numerous problems in process control systems, such as a loss of view or a loss of control over the industrial processes.

SUMMARY

This disclosure provides a gateway supporting transparent redundancy in process control systems and other systems and related method.

In a first embodiment, a method includes synchronizing a first gateway with information from a second gateway. The second gateway operates in a primary role with at least one primary network address. The second gateway communicates with at least one wireless device that uses at least one encryption key during at least one secure communication session. The information includes the at least one encryption key. The method also includes detecting a switchover event at the first gateway. The method further includes, in response to detecting the switchover event, switching the first gateway to the primary role, communicating using the at least one primary network address, and maintaining the at least one secure communication session at the first gateway after the first gateway switches to the primary role.

In a second embodiment, a gateway includes at least one transceiver configured to communicate with a second gateway. The gateway also includes at least one processing device configured to synchronize the gateway with information from the second gateway. The second gateway is configured to operate in a primary role with at least one primary network address. The second gateway is configured to communicate with at least one wireless device that uses at least one encryption key during at least one secure communication session. The information includes the at least one encryption key. The at least one processing device is also configured to detect a switchover event at the gateway. The at least one processing device is further configured to, in response to detecting the switchover event, switch the gateway to the primary role, begin communicating using the at least one primary network address, and maintain the at least one secure communication session at the gateway after the gateway switches to the primary role.

In a third embodiment, a computer readable medium embodies a computer program. The computer program includes computer readable program code for synchronizing a first gateway with information from a second gateway. The second gateway is configured to operate in a primary role with at least one primary network address. The second gateway is configured to communicate with at least one wireless device that uses at least one encryption key during at least one secure communication session. The information includes the at least one encryption key. The computer program also includes computer readable program code for detecting a switchover event at the first gateway. The computer program further includes computer readable program code for, in response to detecting the switchover event, switching the first gateway to the primary role, communicating using the at least one primary network address, and maintaining the at least one secure communication session at the first gateway after the first gateway switches to the primary role.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 10 through 12 illustrate example graphical user interfaces for configuring redundant gateways and other gateways according to this disclosure.

DETAILED DESCRIPTION

FIGS. 1 through 13, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
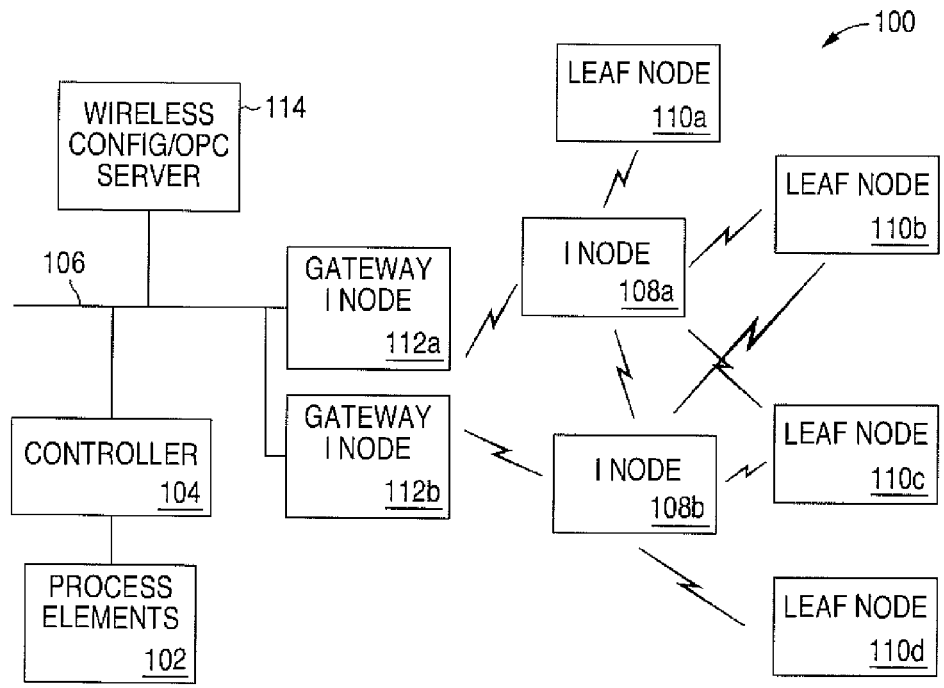
FIG. 1 illustrates an example process control system supporting the use of redundant gateways according to this disclosure.

FIG. 1 illustrates an example process control system 100 supporting the use of redundant gateways according to this disclosure. In this example embodiment, the system 100 includes one or more process elements 102. The process elements 102 represent components in a process system that perform any of a wide variety of functions. For example, the process elements 102 could represent sensors, actuators, or any other or additional industrial equipment in a processing environment. Each process element 102 includes any suitable structure for performing one or more functions in a process system. Also, a process system may represent any system or portion thereof configured to process one or more materials in some manner.

A controller 104 is coupled to the process elements 102. The controller 104 controls the operation of one or more of the process elements 102. For example, the controller 104 could receive information associated with the process system, such as sensor measurements from some of the process elements 102. The controller 104 could use this information to provide control signals to others of the process elements 102, thereby adjusting the operation of those process elements 102. The controller 104 includes any hardware, software, firmware, or combination thereof for controlling one or more process elements 102. The controller 104 could, for example, represent a computing device executing a MICROSOFT WINDOWS operating system.

A network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks, metropolitan area networks, wide area networks (WANs), all or a portion of a global network, or any other communication system or systems at one or more locations.

In FIG. 1, the process control system 100 also includes one or more wireless networks for communicating with wireless sensors or other devices. In this example, a wireless network includes infrastructure nodes ("I nodes") 108a-108b, leaf nodes 110a-110d, and redundant gateway infrastructure nodes 112a-112b.

The infrastructure nodes 108a-108b and the leaf nodes 110a-110d engage in wireless communications with each other. For example, the infrastructure nodes 108a-108b may receive data transmitted over the network 106 (via a gateway infrastructure node 112a or 112b) and wirelessly communicate the data to the leaf nodes 110a-110d. Also, the leaf nodes 110a-110d may wirelessly communicate data to the infrastructure nodes 108a-108b for forwarding to the network 106 (via a gateway infrastructure node 112a or 112b). In addition, the infrastructure nodes 108a-108b may wirelessly exchange data with one another. In this way, the nodes 108a-108b (and 112a-112b and optionally 110a-110d) form a wireless network capable of providing wireless coverage to leaf nodes and other devices in a specified area, such as a large industrial complex.

In this example, the nodes 108a-108b and 110a-110d are divided into infrastructure nodes and leaf nodes. The infrastructure nodes 108a-108b typically represent routing devices that can store and forward messages for other devices. Infrastructure nodes 108a-108b are typically line-powered devices, meaning these nodes receive operating power from an external source. Infrastructure nodes 108a-108b are typically not limited in their operations since they need not minimize power consumption to increase the operational life of their internal power supplies. On the other hand, the leaf nodes 110a-110d are generally non-routing devices that do not store and forward messages for other devices (although they could). Leaf nodes 110a-110d typically represent devices powered by local power supplies, such as nodes that receive operating power from internal batteries or other internal power supplies. Leaf nodes 110a-110d are often more limited in their operations in order to help preserve the operational life of their power supplies.

The nodes 108a-108b and 110a-110d include any suitable structures facilitating wireless communications, such as radio frequency (RF) frequency-hopping spread spectrum (FHSS) or direct sequence spread spectrum (DSSS) transceivers. The nodes 108a-108b and 110a-110d could also include other functionality, such as functionality for generating or using data communicated over the wireless network. For example, the leaf nodes 110a-110d could represent wireless sensors used to measure various characteristics within an industrial facility. The sensors could collect and communicate sensor readings to the controller 104 via the wireless network. The leaf nodes 110a-110d could also represent wireless actuators that receive control signals from the controller 104 and adjust the operation of the industrial facility. In this way, the leaf nodes may include or operate in a similar manner as the process elements 102 physically connected to the controller 104. The leaf nodes 110a-110d could further represent handheld user devices (such as INTELATRAC devices from HONEYWELL INTERNATIONAL INC.), mobile stations, programmable logic controllers, or any other or additional devices. The infrastructure nodes 108a-108b may also include any of the functionality of the leaf nodes 110a-110d or the controller 104.

Each of the gateway infrastructure nodes 112a-112b can communicate wirelessly with, transmit data to, and receive data from one or more infrastructure nodes and possibly one or more leaf nodes. Each gateway infrastructure node 112a-112b may also convert data between protocol(s) used by the network 106 and protocol(s) used by the nodes 108a-108b and 110a-110d. For example, each gateway infrastructure node 112a-112b could convert Ethernet-formatted data transported over the network 106 into a wireless protocol format (such as an IEEE 802.11a, 802.11b, 802.11g, 802.11n, 802.15.3, 802.15.4, or 802.16 format) used by the nodes 108a-108b and 110a-110d. Each gateway infrastructure node 112a-112b could also convert data received from one or more of the nodes 108a-108b and 110a-110d into Ethernet-formatted data for transmission over the network 106. In addition, each gateway infrastructure node 112a-112b could support various functions, such as network creation and security, used to create and maintain a wireless network. Each gateway infrastructure node 112a-112b includes any suitable structure for facilitating communication between components or networks using different protocols.

In particular embodiments, various wireless nodes 108a-108b, 112a-112b (and possibly 110a-110d) in the wireless network of FIG. 1 form a mesh network communicating at 2.4 GHz or 5.8 GHz. Also, in particular embodiments, data can be injected into the wireless mesh network through the infrastructure nodes or leaf nodes. This can therefore provide versatile, multifunctional, plant-wide coverage for wireless sensing, asset location tracking, personnel tracking, wireless communications, and any other or additional functionality as desired.

A wireless configuration and OLE for Process Control (OPC) server 114 can configure and control various aspects of the system 100. For example, the server 114 could configure the operation of the nodes 108a-108b, 110a-110d, and 112a-112b. The server 114 could also support security in the system 100, such as by distributing cryptographic keys or other security data to various components in the system 100 (like the nodes 108a-108b, 110a-110d, and 112a-112b). The server 114 includes any hardware, software, firmware, or combination thereof for configuring wireless networks and providing security information.

In one aspect of operation, the gateway infrastructure nodes 112a-112b operate as a redundant pair. One node 112a-112b operates as a primary gateway and transports data between the wired and wireless networks. The other node 112a-112b operates as a secondary gateway that maintains synchronization with the primary gateway. In some embodiments, the secondary gateway is passive, meaning it does not transport data between the wired and wireless networks. The secondary gateway maintains synchronization with the primary gateway by receiving information from the primary gateway over a wired or wireless channel (possibly a secure encrypted channel). For instance, the gateways could communicate using dedicated TCP ports. The information that is synchronized could include configuration data and runtime data. More specific examples of the information that is synchronized can include device databases, external interface configurations, network topology data, network addresses, and runtime security data. The runtime security data could include security session counters (such as five-bit counters that could be synchronized at least every 31 messages sent), key encryption keys (KEKs), nonce values, and encryption keys used to communicate with other devices. The information data could also include data sent to and received from wireless leaf nodes or other devices.

At some point in time, the primary gateway may become unavailable, such as due to a hardware fault, a software fault, or a communication fault (like wireless interference). When this occurs, the secondary gateway changes its role and begins acting as a new primary gateway. Among other things, this role change causes the secondary gateway to begin using one or more network addresses used by the prior primary gateway. This role change is transparent to other components of the system 100, such as the infrastructure nodes 108a-108b, the leaf nodes 110a-110d, and wired components coupled to the network 106.

Moreover, because the secondary gateway maintains synchronization with the primary gateway prior to the loss of the primary gateway, secure communication channels between the prior primary gateway and other components can be maintained by the secondary gateway after the secondary gateway assumes the primary role. As a result, security sessions involving the prior primary gateway can be maintained by the new primary gateway, even after the role change. This allows secure channels to be maintained after a switchover, meaning the switchover may be completely transparent to the other components of the system 100. Additional details regarding the redundancy functionality of the gateway infrastructure nodes 112a-112b are provided below.

Although FIG. 1 illustrates one example of a process control system 100 supporting the use of redundant gateways, various changes may be made to FIG. 1. For example, the system 100 could include any number of process elements, controllers, networks (wired or wireless), infrastructure nodes (gateway or other), leaf nodes, and servers. Also, the functional division shown in FIG. 1 is for illustration only. Various components in FIG. 1 could be combined, subdivided, or omitted and additional components could be added according to particular needs. In addition, FIG. 1 illustrates one example operational environment where the use of redundant gateways can be supported. This functionality could be used in any other suitable system (whether or not related to process control).

Figure 2:
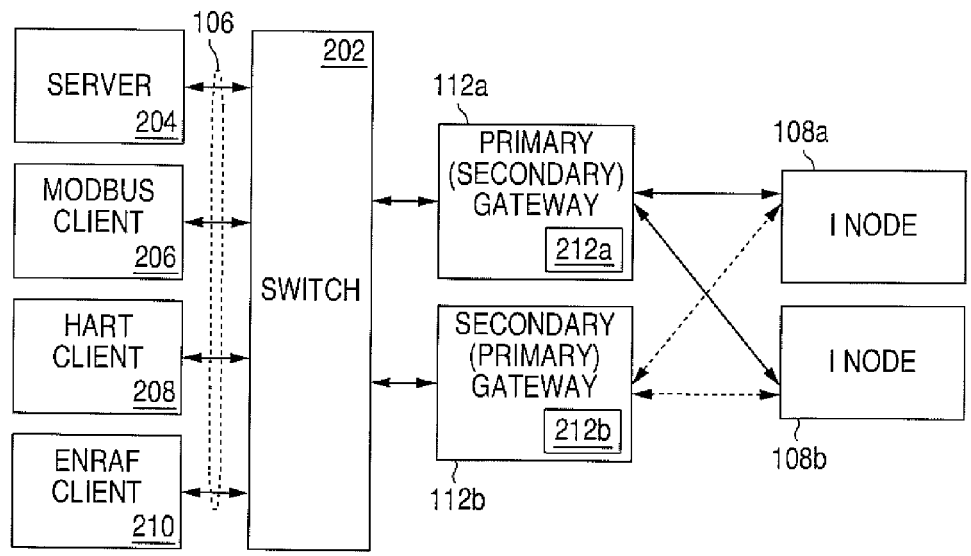
FIG. 2 illustrates additional details regarding an example use of redundant gateways in a process control system according to this disclosure.

FIG. 2 illustrates additional details regarding an example use of redundant gateways in a process control system according to this disclosure. As shown in FIG. 2, the gateway infrastructure nodes 112a-112b communicate wirelessly with the infrastructure nodes 108a-108b. The gateway infrastructure nodes 112a-112b also communicate over the network 106 through a switch 202, which represents any suitable switching or routing network device.

In this example, the gateway infrastructure nodes 112a-112b communicate with various components 204-210 over the network 106. These components include a server 204, which represents any suitable computing device executing any suitable applications, such as process control or other industrial applications. The components also include a MODBUS client 206, which supports the MODBUS communication protocol and can perform any suitable functions. The components further include a HART client 208, which supports the HART protocol and can perform any suitable functions. In addition, the components include an ENRAF client 210, which denotes a level gauging system from HONEYWELL ENRAF.

In FIG. 2, the gateway infrastructure node 112a is currently functioning as a primary gateway, and the gateway infrastructure node 112b is currently functioning as a secondary gateway. However, the gateway infrastructure node 112a can fail or otherwise become unavailable or become a secondary gateway, and the gateway infrastructure node 112b can become a primary gateway. In the configuration shown in FIG. 2, wired components can communicate with the primary gateway using a primary wired network address (such as a primary IP address). The infrastructure nodes 108a-108b can also communicate with the primary gateway using a primary wireless network address (such as a primary WIRELESS NETWORK FOR SECURE INDUSTRIAL APPLICATION or "WNSIA" address supported by the WNSIA protocol from HONEYWELL INTERNATIONAL INC.). The secondary gateway can have a unique secondary wired network address and a unique secondary wireless network address. If the primary gateway fails, however, the secondary gateway switches over and begins using the primary wired and wireless network addresses. This allows the secondary gateway to change roles and assume operation as a new primary gateway in a way that is transparent to other components.

In some embodiments, the wired and wireless network addresses can be assigned as follows. For wired network addresses, the primary and secondary wired addresses can be explicitly defined in a network database, such as an engineering repository database (ERDB). Although not required, certain rules could be used to define the primary and secondary wired network addresses. For instance, the primary wired address could have an odd last numeral, and the secondary wired address could have an even last numeral that is one greater than the odd numeral (such as 192.168.1.101 and 192.168.1.102).

When a gateway starts operation, the gateway can retrieve a default wired network address, a primary wired network address, and a secondary wired network. The default wired network address represents the wired network address used during startup. The primary and secondary wired network addresses represent the network addresses to be used when operating in the primary and secondary roles, respectively. If the gateway decides to operate in the primary role, the gateway can use the primary wired address and connect to a gateway operating in the secondary role (which uses the secondary wired address). If the gateway decides to operate in the secondary role, the gateway can use the secondary wired address and connect to a gateway operating in the primary role (which uses the primary wired address), or the gateway can synchronize with the primary gateway after being contacted by the primary gateway.

For wireless network addresses, the primary and secondary wireless addresses can be automatically assigned in a network database, such as an ERDB. Although not required, certain rules could be used to assign wireless network addresses, as well. For instance, the wireless network addresses for non-redundant or primary gateways could be within a range of 0xF001-0xF7FF, while the wireless network addresses for secondary gateways could be within a range of 0xF801-0xFFFF. Also, the primary and secondary wireless network addresses can be paired together, such as when 0xF001 is paired with 0xF801, 0xF002 is paired with 0xF802, and so on.

When a gateway starts operation, the gateway can retrieve a default wireless network address, a primary wireless network address, and a secondary wireless network address. The default wireless address represents the wireless address assigned to the gateway during encryption key deployment. The primary and secondary wireless addresses represent the network addresses to be used when operating in the primary and secondary roles, respectively.

In some embodiments, the gateway infrastructure nodes 112a-112b include configuration information 212a-212b, respectively. In particular embodiments, the configuration information 212a-212b could take the form of system status pages (SSPs), which are pages or other data structures shared between multiple applications executed by the gateways. The configuration information 212a-212b in a gateway could include the following parameters:

SSP Signature: A signature identifying an SSP version, which can be used to identify structural changes in the SSP;

ModIsRedun: A flag that indicates if the gateway is configured for non-redundant or redundant operation;

PrevDefIpAddr: A last known default IP address of the gateway;

PriIpAddr, SecIpAddr: IP addresses used for non-redundant/primary operation and secondary operation, respectively;

PrevRedunRole, PrevSyncState: A last known redundancy role and a last known synchronization state, respectively, of the gateway; and PriNwAddr, SecNwAddr: Wireless network addresses used for non-redundant/primary operation and secondary operation, respectively.

When a gateway starts operating, the gateway can use various parameters (such as the ModIsRedun, PrevRedunRole, and PrevSyncState parameters) to determine if it is to operate in a non-redundant, primary, or secondary mode of operation. The gateway can also use various parameters (such as the PrevDefIpAddr, PriIpAddr, and SecIpAddr parameters) to select an IP network address. In addition, the gateway can use various parameters (such as the PriNwAddr and SecNwAddr parameters) to select a wireless network address.

Note that communications using separate primary and secondary network addresses are for illustration only. In other embodiments, communications can occur using multicast addresses. In these or other embodiments, the secondary gateway can be synchronized to the primary gateway and the primary gateway can be synchronized to the secondary gateway. In this way, if the secondary gateway receives a message that the primary gateway did not (due to, for instance, wireless interference), the primary gateway or the secondary gateway could process and use or forward the message. In still other embodiments, communications between the gateways could occur using a serial communication link coupling the gateways or in any other suitable manner.

Although FIG. 2 illustrates additional details regarding one example use of redundant gateways 112a-112b in a process control system, various changes may be made to FIG. 2. For example, the gateway infrastructure nodes 112a-112b could communicate with any other or additional components over one or more networks 106 or other communication medium. Also, various components in FIG. 2 could be combined, subdivided, or omitted and additional components could be added according to particular needs.

Figure 3:
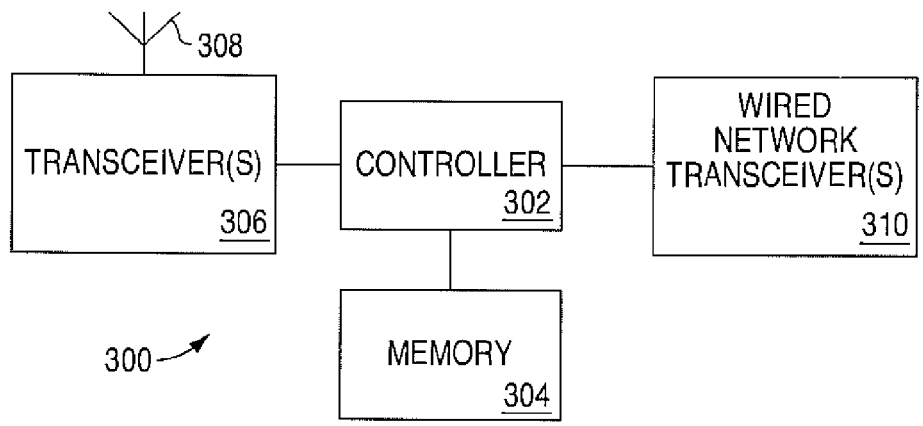
FIG. 3 illustrates an example redundant gateway according to this disclosure.

FIG. 3 illustrates an example redundant gateway 300 according to this disclosure. The gateway 300 could, for example, be used as the gateway infrastructure nodes 112a-112b in the system 100 of FIG. 1.

As shown in FIG. 3, the gateway 300 includes a controller 302. The controller 302 controls the overall operation of the gateway 300. For example, the controller 302 may receive or generate data to be transmitted externally, and the controller 302 could provide the data to one or more other components in the gateway 300 for transmission over a wired or wireless network. The controller 302 could also receive data over a wired or wireless network and use or pass on the data. As particular examples, the controller 302 could receive data from a wired network and provide the data for wireless transmission (or vice versa). The controller 302 could also receive data from another gateway and use the data to maintain synchronization with the other gateway. The controller 302 could perform any other or additional functions to support the operation of the gateway 300.

The controller 302 includes any suitable hardware, software, firmware, or combination thereof for controlling the operation of a gateway. As particular examples, the controller 302 could represent a processor, microprocessor, microcontroller, field programmable gate array (FPGA), or other processing or control device.

A memory 304 is coupled to the controller 302. The memory 304 stores any of a wide variety of information used, collected, or generated by the gateway 300. For example, the memory 304 could store information received over one network that is to be transmitted over the same or different network. The memory 304 could also store information used to synchronize the gateway 300 with another gateway. The memory 304 includes any suitable volatile and/or non-volatile storage and retrieval device or devices.

The gateway 300 also includes one or more wireless transceivers 306 coupled to one or more antennas 308. The transceiver(s) 306 and antenna(s) 308 can be used by the gateway 300 to communicate wirelessly with other devices. For example, the transceiver(s) 306 and antenna(s) 308 can be used to communicate with leaf nodes, infrastructure nodes, other gateway infrastructure nodes, or WiFi or other devices (such as wireless controllers or hand-held user devices). Each transceiver 306 may be coupled to its own antenna(s) 308, or multiple transceivers 306 can share a common antenna 308. Each transceiver 306 includes any suitable structure for generating signals to be transmitted wirelessly and/or receiving signals received wirelessly. In some embodiments, each transceiver 306 represents an RF transceiver. Note that each transceiver could include a transmitter and a separate receiver. Also, each antenna 308 could represent an RF antenna (although any other suitable wireless signals could be used to communicate).

The gateway 300 further includes one or more wired network transceivers 310. The wired network transceivers 310 allow the gateway 300 to communicate over one or more wired networks, such as the network 106. Each wired network transceiver 310 includes any suitable structure for transmitting and/or receiving signals over a wired network, such as an Ethernet interface.

As noted above, the gateway 300 can perform various operations to maintain redundancy between itself and another gateway. Example operations that can be performed by the gateway 300 are described below. These examples include:

Role determination: a gateway determining whether it is to operate in a non-redundant role, a primary role, or a secondary role;

Switchover: a gateway changing its role;

Synchronization initiation: a gateway starting synchronization with another gateway;

Synchronization termination: a gateway stopping synchronization with another gateway; and Becoming primary: a secondary gateway becoming a primary gateway.

Although FIG. 3 illustrates one example of a redundant gateway 300, various changes may be made to FIG. 3. For example, various components in FIG. 3 could be combined, subdivided, or omitted and additional components could be added according to particular needs. Also, depending on the implementation, the gateway 300 may represent a wireless gateway that can communicate wirelessly using its own transceiver(s) 306, or the gateway 300 could communicate with other nodes over wired connections (where those other nodes communicate wirelessly). In general, a "wireless" gateway or other device may represent any device that can transmit and/or receive data wirelessly (even if the "wireless" device has the ability to transmit and/or receive data over a wired connection, as well).

Figure 4:
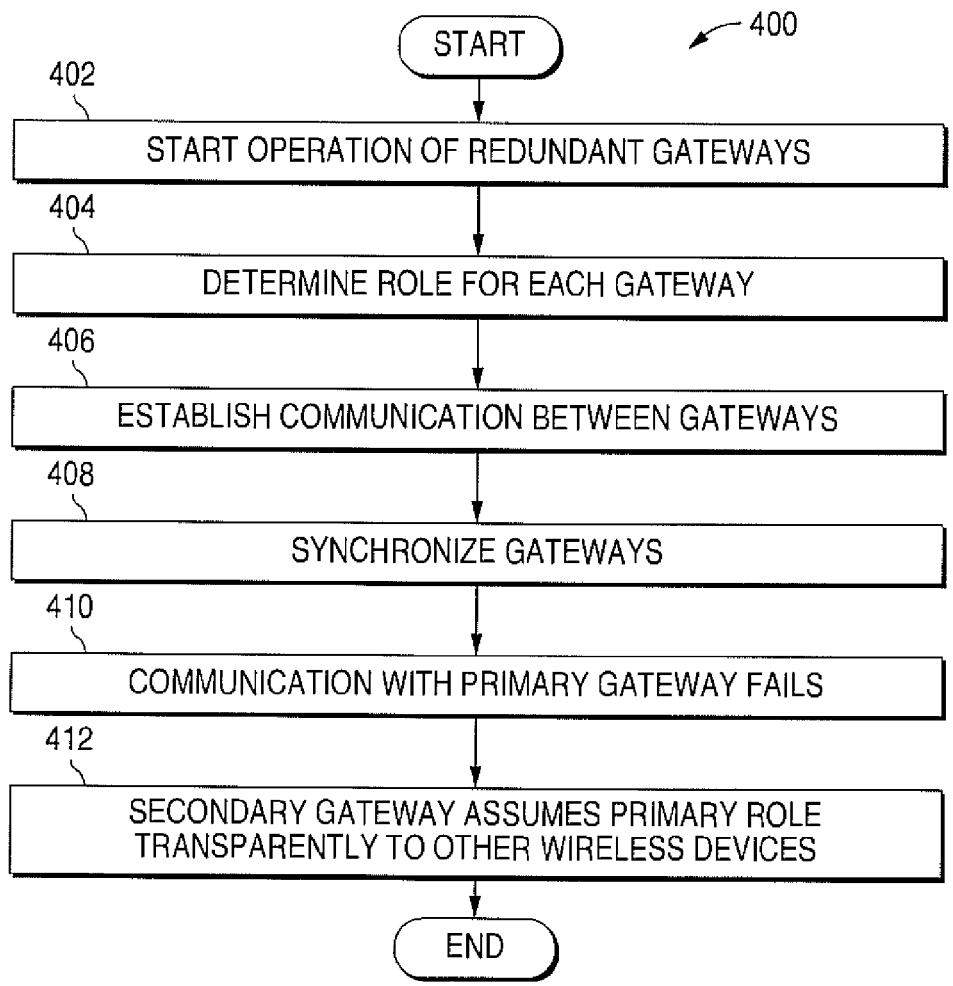
FIG. 4 illustrates an example method for using redundant gateways in a process control system or other system according to this disclosure.

FIG. 4 illustrates an example method 400 for using redundant gateways in a process control system or other system according to this disclosure. As shown in FIG. 4, at least two redundant gateways begin operation at step 402. This could include, for example, powering up redundant gateway infrastructure nodes or other gateways. A role for each gateway is determined at step 404. This could include, for example, each gateway determining whether it will operate in a primary role or a secondary role (note that a non-redundant role could also be used, although FIG. 4 assumes redundant gateways are being used).

Communication is established between the redundant gateways at step 406. This could include, for example, the primary gateway establishing a secure or unsecure communication session with the secondary gateway. For instance, the primary gateway could initiate the communication session using a secondary network address associated with the secondary gateway. This could also include the secondary gateway contacting the primary gateway using a primary network address associated with the primary gateway. The gateways are synchronized at step 408. This could include, for example, the primary gateway sending information about device databases, external interface configurations, network address changes, and runtime security data to the secondary gateway. As a particular example, encryption keys for communications between the primary gateway and other wireless devices could be changed frequently, and these encryption keys and other security-related data can be synchronized.

At some point, communication with the primary gateway fails at step 410. This could be due to a hardware failure, a software failure, or interference or other communication failure. The failure can be detected by the secondary gateway in any suitable manner. For instance, in some embodiments, the primary gateway sends periodic "heartbeat" signals to the secondary gateway, and the secondary gateway can detect failure of the primary gateway after not receiving one or more heartbeat signals.

When communication with the primary gateway fails, the secondary gateway assumes the primary role at step 412. This could include, for example, the secondary gateway beginning to use the primary wired and wireless network addresses. This could also include the secondary gateway maintaining any secure communication sessions with other devices. In this way, the failure of the primary gateway and the role change in the secondary gateway may be transparent to the other devices.

Although FIG. 4 illustrates one example of a method 400 for using redundant gateways in a process control system or other system, various changes may be made to FIG. 4. For example, various steps in FIG. 4 (such as the role determination, the synchronization, and the role change) can be triggered in response to any suitable event, including user commands.

Figure 5A:
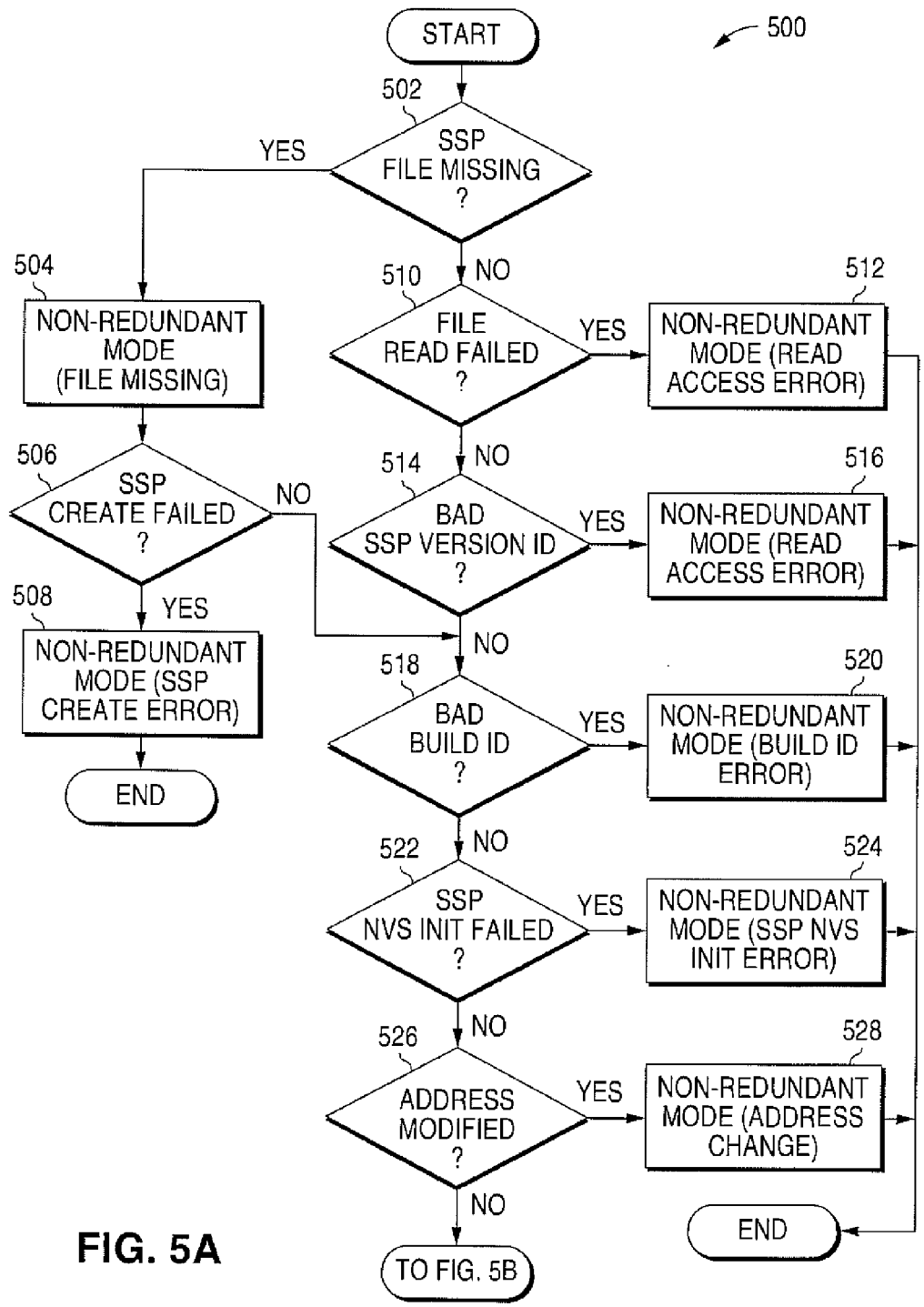
FIGS. 5A and 5B illustrate an example method for role determination in a gateway according to this disclosure.
Figure 5B:
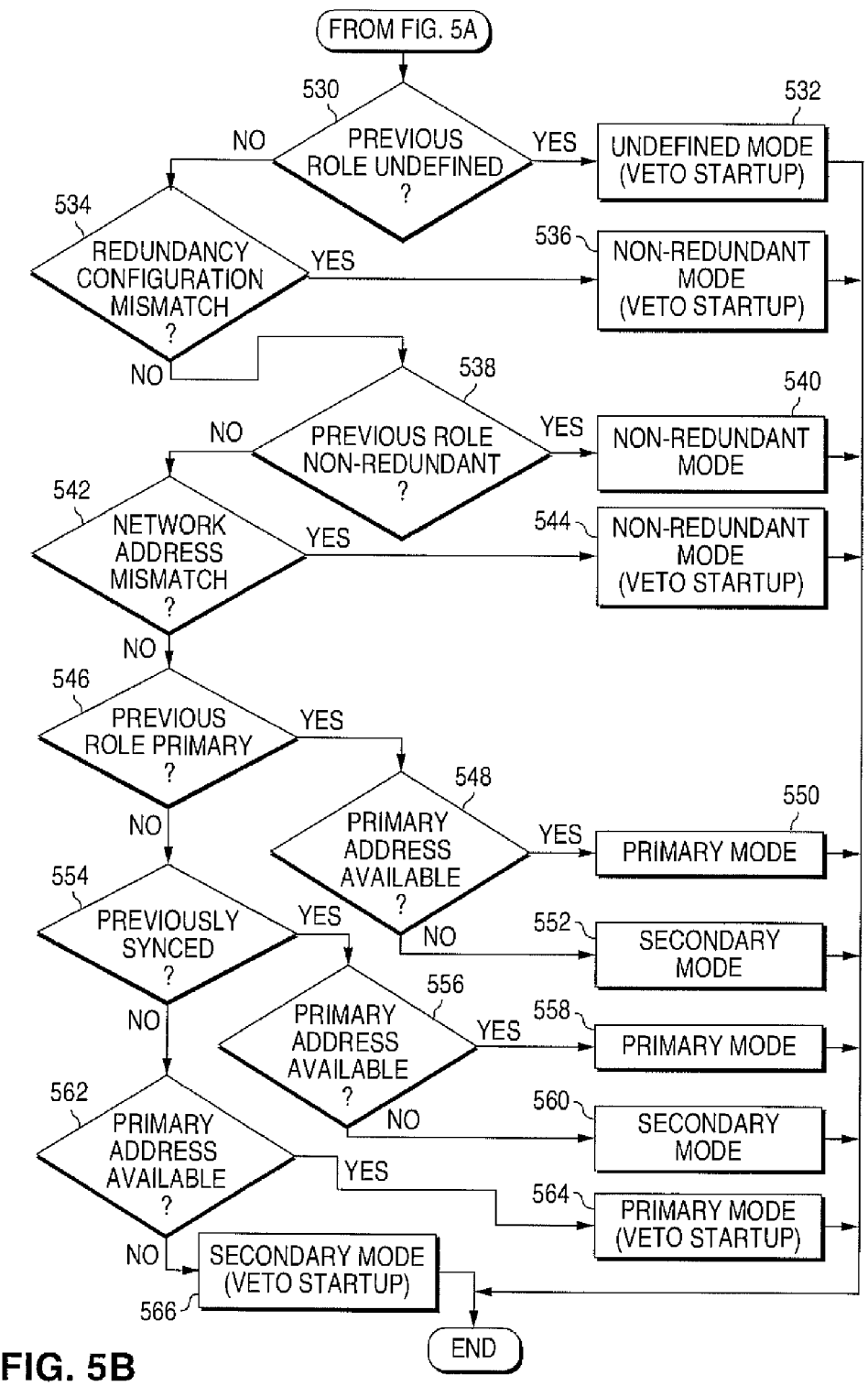

FIGS. 5A and 5B illustrate an example method 500 for role determination in a gateway according to this disclosure. The method 500 could be used, for example, during step 404 in the method 400 of FIG. 4. In the method 500, the gateway generally attempts to access configuration data contained in an SSP and determine whether to start operating in a non-redundant, primary, or secondary role.

As shown in FIGS. 5A and 5B, the method 500 first determines whether the gateway operates in the non-redundant role. The gateway determines whether its SSP file is missing at step 502. This could include, for example, the controller 302 determining whether an SSP file is contained in the memory 304. If not, the gateway enters the non-redundant role and sets a database retention veto (described below) indicating that the SSP file is missing at step 504. The gateway attempts to create an SSP file and determines if the attempt was successful at step 506. If not, the gateway remains in the non-redundant role and sets a database retention veto indicating that an SSP create error exists at step 508.

If the SSP file exists, the gateway attempts to read the SSP file and determines if the attempt was successful at step 510. If not, the gateway enters the non-redundant role and sets a database retention veto indicating that a read access error exists at step 512. If the SSP file is read successfully, the gateway determines if the SSP file has a bad or invalid version identifier at step 514. This could include, for example, the controller 302 verifying a digital signature of the SSP, such as by comparing a current signature to a previous signature. If the SSP file has an invalid identifier, the gateway enters the non-redundant role and sets a database retention veto indicating that a read access error exists at step 516. If the SSP file has a valid identifier, the gateway determines if the gateway has a bad or invalid build (firmware) identifier at step 518. This could include, for example, the controller 302 identifying the build number of its firmware. If not, the gateway enters the non-redundant role and sets a database retention veto indicating that a build identifier error exists at step 520.

The gateway determines if an initialization of the SSP's non-volatile storage (NVS) fails at step 522. In some embodiments, the SSP is stored in a non-volatile memory, and the gateway may need to modify the SSP during operation in a redundant role (such as to store new network addresses or a last mode of operation). However, if the non-volatile memory cannot be initialized properly, the gateway may be unable to operate in the redundant role since it would be unable to update various parameters in the SSP. In that case, the gateway enters the non-redundant role and sets a database retention veto indicating that an SSP NVS initialization error exists at step 524.

The gateway determines if one or more of its network addresses have been changed, such as via a web interface, at step 526. If so, the gateway enters the non-redundant role and sets a database retention veto indicating that its network address has changed at step 528.

As shown in FIG. 5B, a determination is made whether the gateway's previous role was undefined at step 530. This could include, for example, the controller 302 examining the last known redundancy role contained in the SSP. If the previous role was undefined, the gateway enters the undefined role and sets a database retention veto indicating a startup error exists at step 532. In the undefined role, the gateway can operate using its default network addresses. The gateway also determines if its previous and current redundancy configurations match at step 534. If not, the gateway enters the non-redundant role and sets a database retention veto indicating a startup error exists at step 536. If the redundancy configurations match, the gateway determines if its previous role was as a non-redundant gateway at step 538. If so, the gateway enters the non-redundant role and does not perform a database retention veto at step 540.

The gateway determines whether there is a mismatch between network addresses at step 542. This could include, for example, the controller 302 determining whether the current default IP or other wired address in the SSP matches a previous default network address. This could also include determining whether the IP or other wired address in the SSP matches the address used by a partner gateway when in redundant mode (this handles the situation where the gateway is booting up following an earlier switchover). If a mismatch is found, the gateway enters the non-redundant role and sets a database retention veto indicating a startup error exists at step 544.

If no mismatch is found, the gateway can conclude that it is going to function as one of multiple redundant gateways. The gateway then proceeds to determine whether it should initially enter the primary or secondary role. The gateway determines if its previous role was as a primary gateway at step 546. This could include, for example, the controller 302 examining the last known redundancy role contained in the SSP. If its last role was primary, the gateway determines if one or more primary network addresses are available at step 548. If so, the gateway enters primary mode at step 550; otherwise, the gateway enters secondary mode at step 552. In this case, the formerly-primary gateway can assume either the primary or secondary role depending on the availability of the primary network address(es).

If the gateway determines its previous role was not primary at step 546, the gateway was previously acting as a secondary gateway. The gateway determines if it was previously being synchronized with a primary gateway at step 554. This could include, for example, the controller 302 determining the last known synchronization state using the SSP. If the gateway was previously being synchronized with a primary gateway, the gateway determines if the one or more primary network addresses are available at step 556. If so, the gateway enters primary mode at step 558; otherwise, the gateway enters secondary mode at step 560. In that case, the formerly-secondary gateway can assume either the primary or secondary role depending on the availability of the primary network address(es).

If the gateway determines it was not previously synchronized, the gateway determines if the one or more primary network addresses are available at step 562. If so, the gateway enters primary mode at step 564; otherwise, the gateway enters secondary mode at step 566. In either instance, though, the gateway sets a database retention veto indicating a startup error exists. Since the gateway was not previously synchronized, it cannot use the data in its database.

The above description refers to a database retention veto. The gateway can store settings or other configuration data in its non-volatile memory, which can be retrieved during power up. "Database retention" means that the settings are kept and restored when the gateway is powered on, while "database retention veto" means that the gateway clears its previously-saved configuration data during startup. In FIGS. 5A and 5B, a database retention veto causes the gateway to clear its non-volatile memory (if possible) or otherwise ignore data in the non-volatile memory.

Although FIGS. 5A and 5B illustrate one example of a method 500 for role determination in a gateway, various changes may be made to FIGS. 5A and 5B. For example, while certain tests are shown as occurring in a particular order, the tests could occur in any suitable order. Also, this illustrates only some of the decisions that could be made when determining the role for a gateway. Any other or additional decisions could also be made. In addition, the method 500 could be executed by any suitable application or component in the gateways. For instance, the method 500 could be performed by a watchdog application.

Figure 6:
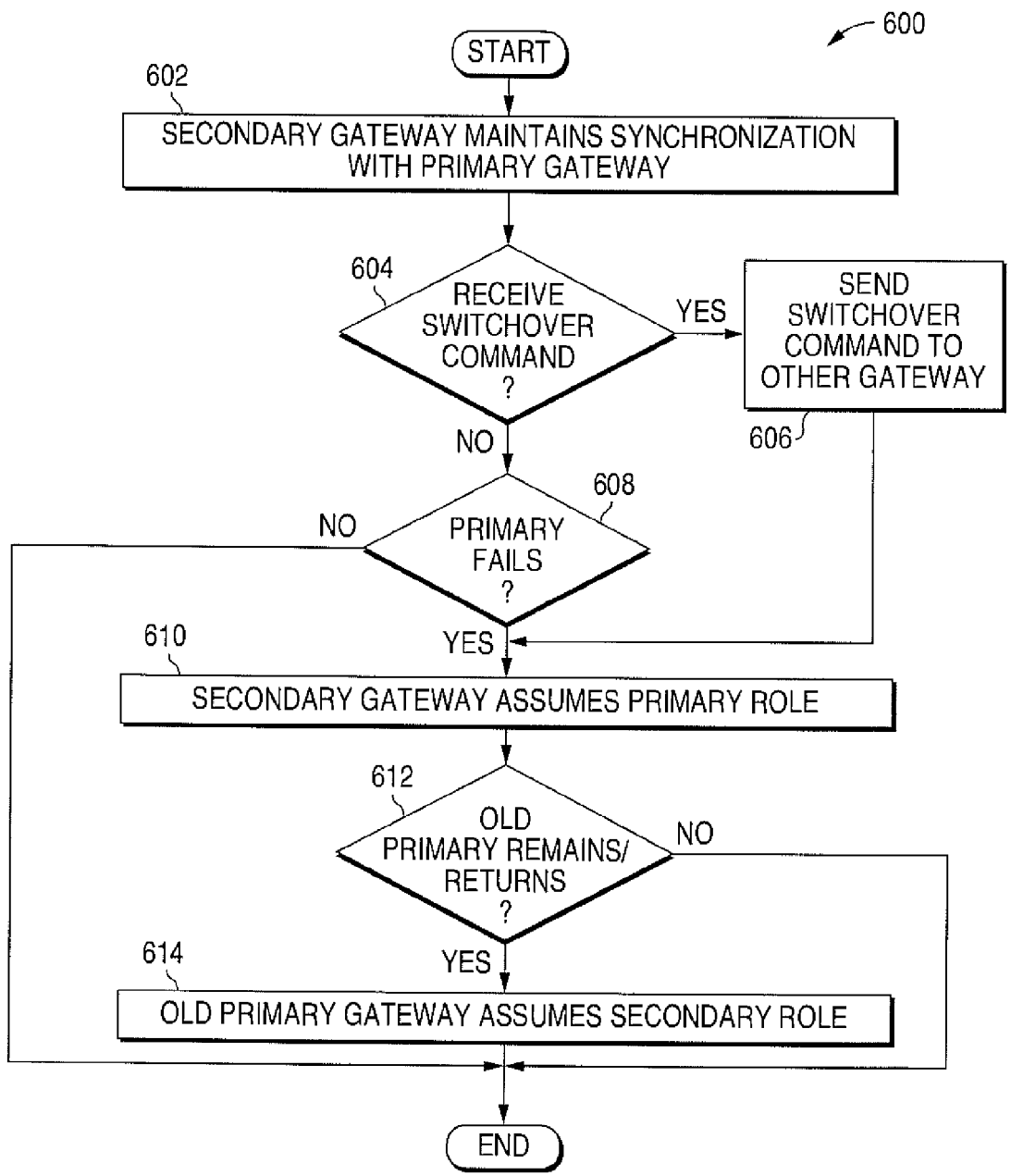
FIG. 6 illustrates an example method for switching between primary and secondary roles in gateways according to this disclosure.

FIG. 6 illustrates an example method 600 for switching between primary and secondary roles in gateways according to this disclosure. The method 600 could be used, for example, during steps 408-412 in FIG. 4. As shown in FIG. 6, a secondary gateway maintains synchronization with a primary gateway at step 602. This could include, for example, the secondary gateway receiving data from the primary gateway regarding the operation of the primary gateway.

Each gateway can determine if a switchover command is received at step 604 and, if so, the gateway sends another switchover command to the other gateway at step 606. The first switchover command could come from any suitable source. For instance, a user could provide the switchover command to the secondary gateway, or the user could provide the switchover command to the primary gateway (which forwards the command to the secondary gateway). If no switchover command is received, the secondary gateway determines if the primary gateway fails at step 608. This could include, for example, the controller 302 in the secondary gateway determining whether heartbeat signals from the primary gateway are received.

In response to either a switchover command or a failure of the primary gateway, the secondary gateway assumes the primary role at step 610. This could include, for example, the secondary gateway assuming the primary gateway's identity, such as by starting to use the primary wired and wireless network addresses. The primary wired and wireless network addresses could then be used by the new primary gateway to facilitate communications (both inbound and outbound) with various devices in the system. Note that in some embodiments, the new primary gateway could send a gratuitous or unsolicited address resolution protocol (ARP) request to the other devices so that the other devices can detect the new primary gateway's medium access control (MAC) address.

If the old primary gateway remains in service or returns to service at step 612, the old primary gateway can assume the secondary role at step 614. This could include, for example, the old primary gateway starting to use the secondary wired and wireless network addresses. The new secondary gateway may or may not begin to synchronize with the new primary gateway.

In this way, the redundant gateways can provide a continuous or substantially continuous view of wireless devices. Moreover, switchovers can be completely or substantially transparent to devices that receive data from or send data to the wireless devices. In particular embodiments, the switchover of a gateway in an industrial process control system from the secondary role to the primary role could be fast enough to support five-second control loops.

Although FIG. 6 illustrates one example of a method 600 for switching between primary and secondary roles in gateways, various changes may be made to FIG. 6. For example, a switchover could occur for any number of reasons and in response to any number of events.

Figure 7:
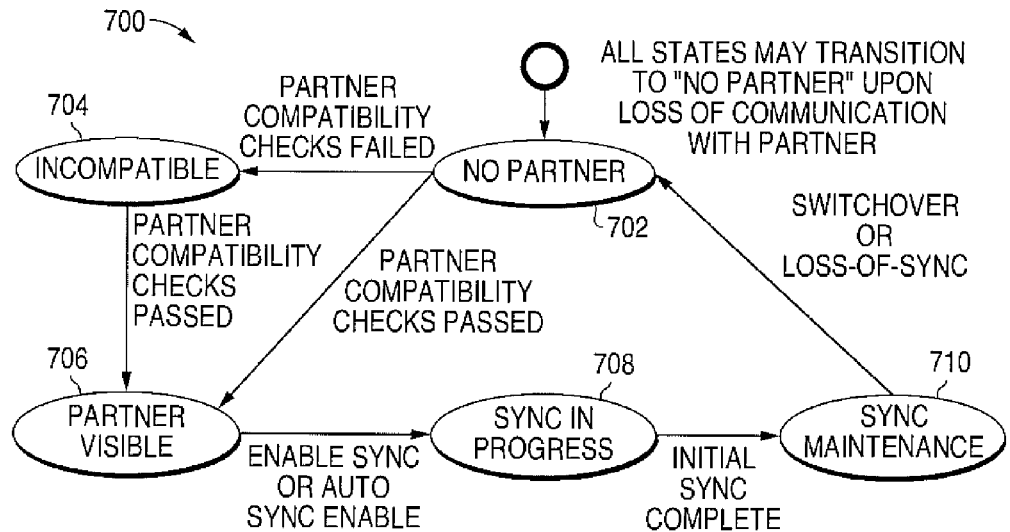
FIG. 7 illustrates an example switchover state machine according to this disclosure.

FIG. 7 illustrates an example switchover state machine 700 according to this disclosure. The switchover state machine 700 could be used, for example, by the controller 302 during step 412 in the method 400 of FIG. 4. As shown in FIG. 7, a gateway may initially start in a "No Partner" state 702, which is an initial or default state where no communications with any partner gateway occur. In this state 702, the gateway can perform the method 500 shown in FIGS. 5A and 5B to determine whether the gateway can or will operate in a redundant role. During this time, the gateway can perform compatibility checks to verify whether the gateway will operate in a redundant role. If any of the compatibility checks fail, the state machine 700 transitions to an "Incompatible" state 704. In this state 704, the gateway can operate in a non-redundant role, although the gateway can continue to check whether any valid partner gateways become visible or redundant operation otherwise becomes possible.

If at some point a valid partner gateway become visible or redundant operation otherwise becomes possible, the gateway transitions to a "Partner Visible" state 706. In this state 706, the gateway may or may not synchronize with the partner gateway. For example, the gateway could initiate synchronization in response to an "enable synchronization" command from a user when in this state 706. The gateway could also automatically initiate synchronization in response to determining that the gateway is configured for auto-synchronization (synchronization occurs automatically whenever possible). The gateway could further prevent synchronization if a "disable synchronization" command has been received.

If synchronization can occur, the gateway transitions to a "Sync in Progress" state 708. In this state 708, the gateway exchanges data with its partner gateway to synchronize the gateways. The synchronization can represent an "initial" synchronization if it is the first time the partner gateways have exchanged data after at least one has power cycled or a database retention veto has occurred. Once the initial synchronization is complete, the gateway can transition to a "Sync Maintenance" state 710. In this state 710, the gateways can continue to exchange data to maintain the synchronization of the gateways. The gateways can remain in this state 710 until a switchover occurs or a loss-of-synchronization happens.

Moreover, any of the states 704-710 can transition to the "No Partner" state 702 if a loss of communication with the partner occurs. This can happen regardless of whether the gateway using the state machine 700 is or is not synchronizing with the partner gateway.

Although FIG. 7 illustrates one example of a switchover state machine 700, various changes may be made to FIG. 7. For example, any other or additional states could be used in the state machine 700. Also, any conditions can be used for state transitions in the state machine 700.

Figure 8:
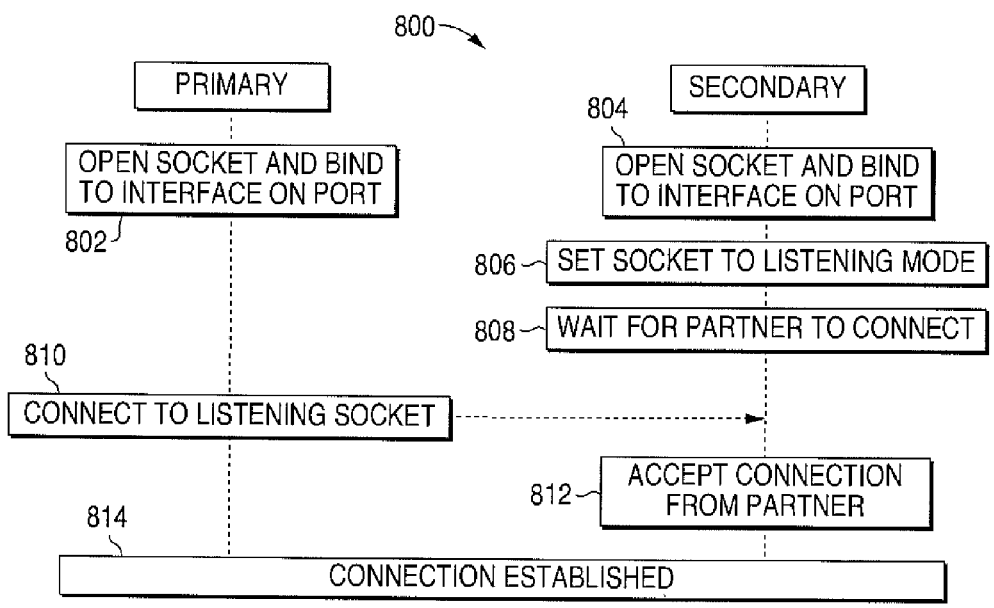
FIG. 8 illustrates an example communication scheme used to synchronize redundant gateways according to this disclosure.

FIG. 8 illustrates an example communication scheme 800 used to synchronize redundant gateways according to this disclosure. This communication scheme 800 could be used, for example, during step 408 in FIG. 8.

As shown in FIG. 8, a primary gateway opens a socket and binds the socket to an interface on a specified port at step 802. This could include, for example, the controller 302 in the primary gateway opening a TCP socket and binding the socket to the brg0 interface on port 55600. A secondary gateway similarly opens a socket and binds the socket to an interface on a specified port at step 804. This could include, for example, the controller 302 in the secondary gateway opening a TCP socket and binding the socket to the brg0 interface on port 55600. The secondary gateway sets its socket to listening mode at step 806 and waits for a partner to connect at step 808. The primary gateway connects to the listening socket of the secondary gateway at step 810, the secondary gateway accepts the connection at step 812, and the connection is established at step 814. Once the connection is established between the gateways, the gateways can exchange messages to synchronize the secondary gateway to the primary gateway.

Although FIG. 8 illustrates one example of a communication scheme 800 used to synchronize redundant gateways, various changes may be made to FIG. 8. For example, any other suitable communication scheme could be used between the gateways.

Figure 9:
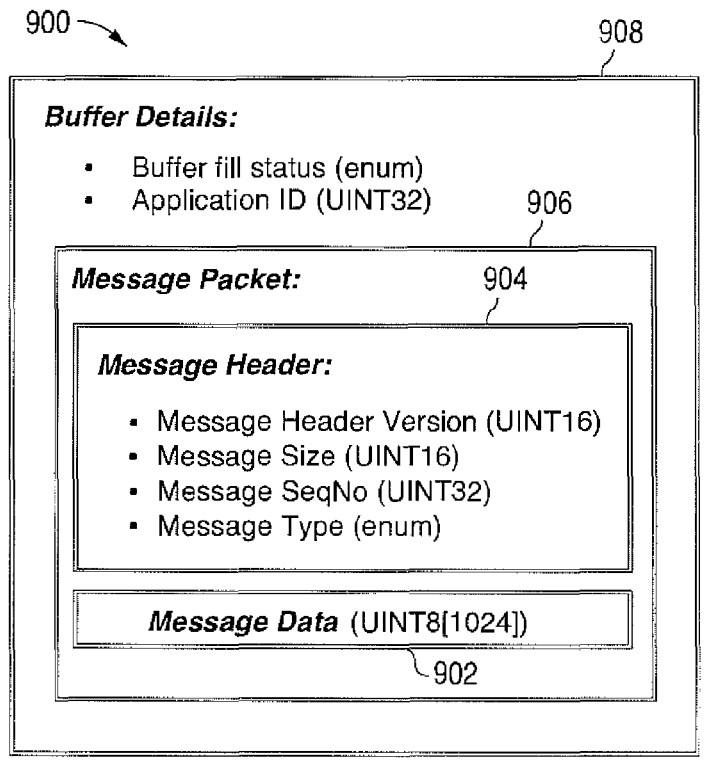
FIG. 9 illustrates an example message structure used to exchange information between gateways during synchronization according to this disclosure.

FIG. 9 illustrates an example message structure 900 used to exchange information between gateways during synchronization according to this disclosure. In this example, the message structure 900 includes message data 902, which could represent a fixed amount of data (such as 1024 bytes). The message data 902 and a message header 904 containing additional information about the data 902 can form a packet 906. Data packets 906 transferred between redundant gateways could have a fixed size, although the amount of meaningful data 902 may differ, such as by padding the data 902 using extra zeros.

In this example, the message header 904 includes a header version, a message size, a sequence number, and a message type. The message type could include one or more of status, sync data, command, and test message types. The information in the header 906 is useful in parsing the data at the receiving side.

Message packets 906 can be encapsulated in a buffer structure 908, which contains additional data to help in managing the message packets 906. This additional data may or may not be transferred to another gateway. In this example, the additional data includes a buffer fill status and an application identifier. The buffer fill status identifies whether the message data 902 in the buffer structure 908 is empty, partially full, or completely full (possibly with padding) and ready for transmission. The application identifier identifies the application (address space) from which the message data 902 in the buffer structure 908 originated. This can be used to determine if any messages from a specific application are awaiting transmission. In these embodiments, a message packet 906 could hold data from a single application, and different message packets 906 could be generated for different applications.

In particular embodiments, ten of these structures 900 are used as transmit buffers in a gateway, and ten of these structures are used as receive buffers in the gateway. The ten transmit buffers can be filled with data (typically by different applications) and transmitted to a partner gateway, and the ten receive buffers can be filled with data received from the partner gateway. It may be noted that any suitable inter-process communication (IPC) mechanism could be used to support communications between processes in a gateway.

Although FIG. 9 illustrates one example of a message structure 900 used to exchange information between gateways during synchronization, various changes may be made to FIG. 9. For example, any other suitable message structure(s) to exchange data between gateways.

Figure 10:
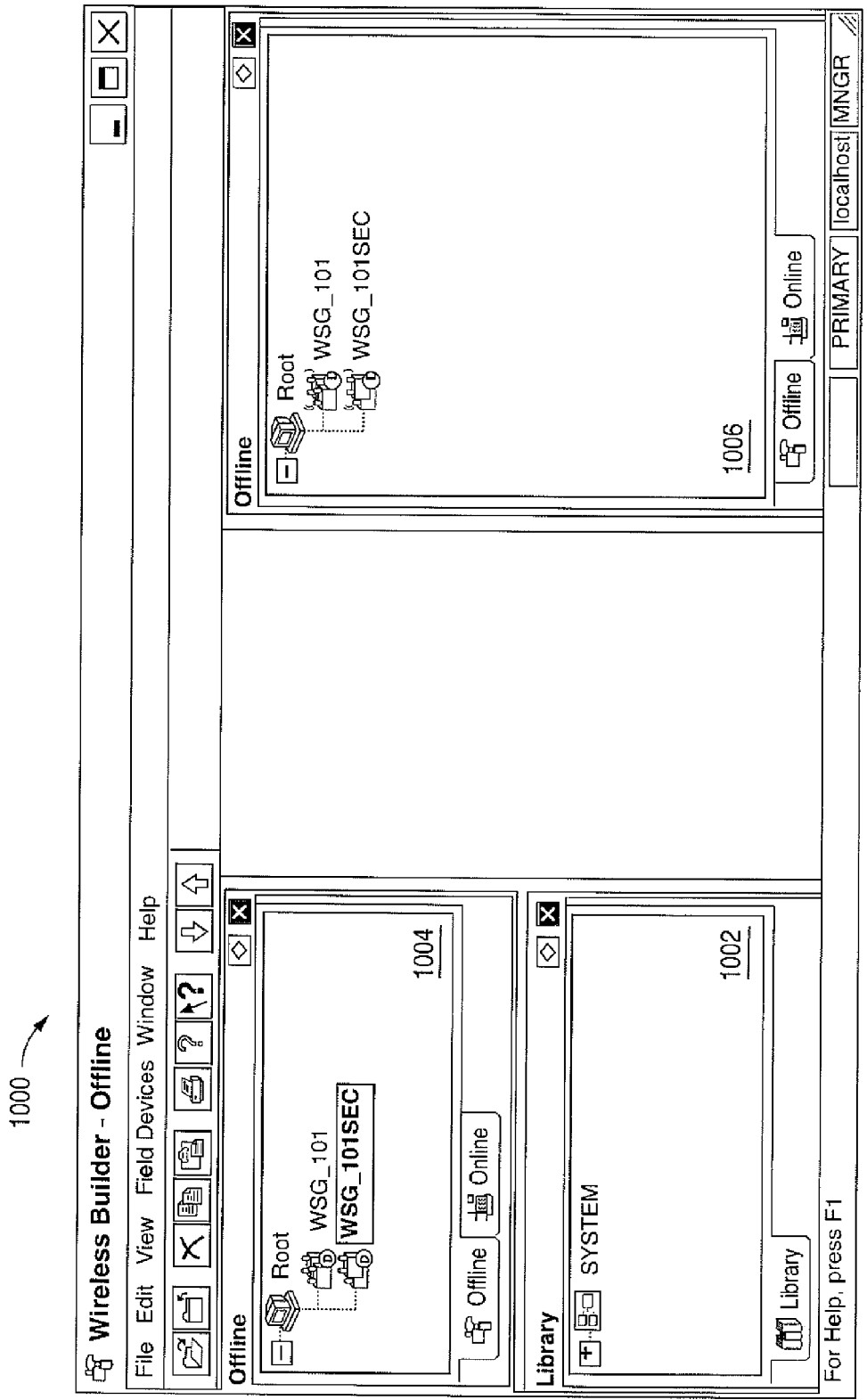
Figure 12:
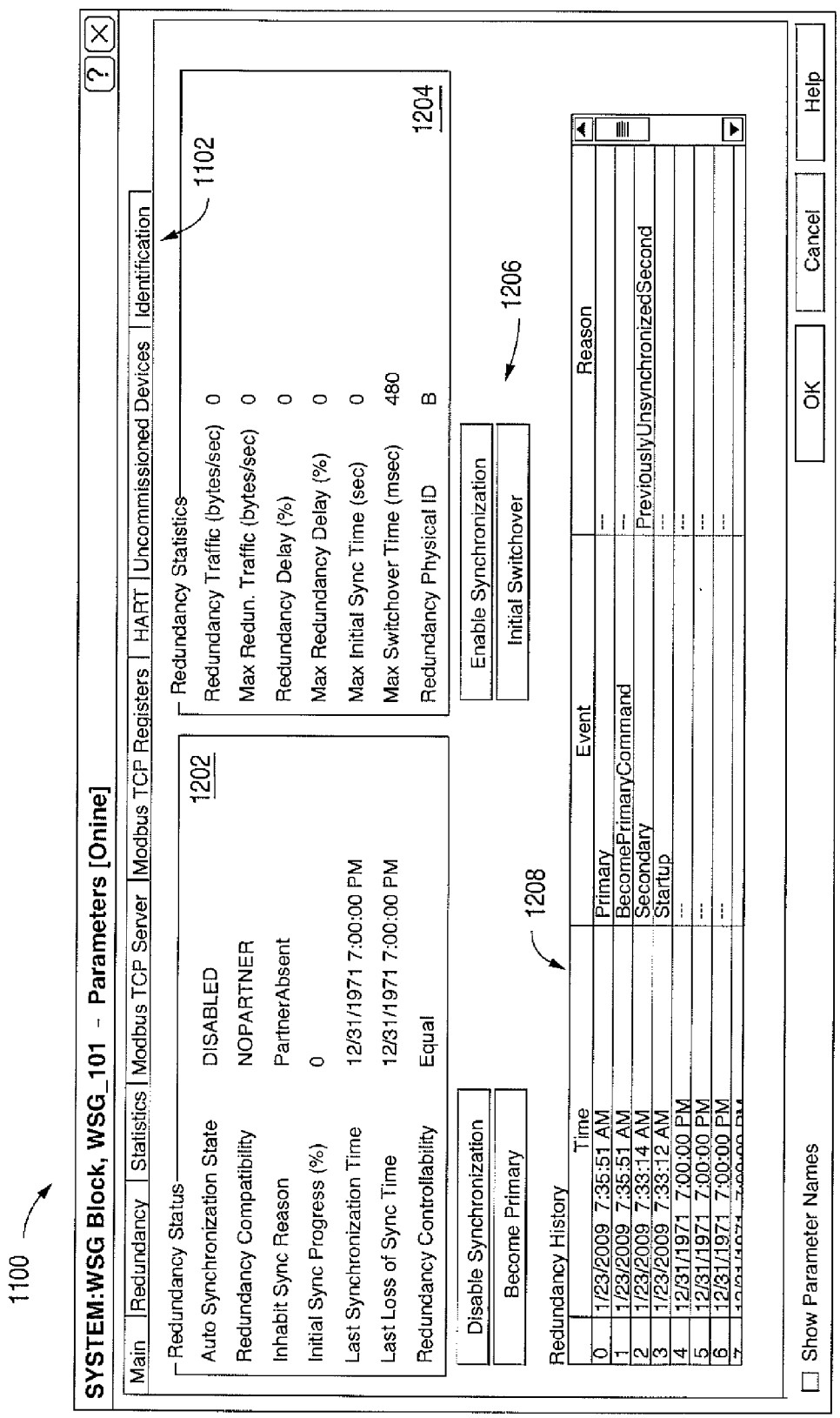

FIGS. 10 through 12 illustrate example graphical user interfaces (GUIs) for configuring redundant gateways and other gateways according to this disclosure. These GUIs can be used, for example, to configure gateway function blocks, which can define the desired functionality of one or more gateways. The function blocks can then be distributed to the gateways for use.

As shown in FIG. 10, a GUI 1000 includes a library section 1002, an offline configuration section 1004, and an online gateway section 1006. The library section 1002 can be used by a user to select and modify various function blocks in a library, including function blocks associated with gateways. When the user selects a library, gateway function blocks can be identified in the offline configuration section 1004 and/or the online gateway section 1006. The offline configuration section 1004 identifies different offline configurations of gateways that can be modified or deleted, and additional offline configurations can be created. The online gateway section 1006 identifies different gateways that have been loaded with the configurations.

In the online gateway section 1006, symbols associated with the identified gateways could vary to identify the status of the corresponding gateways. For example, a single icon can be used when a non-redundant function block is loaded into a gateway, or a pair of icons can be used when function blocks are loaded into a redundant pair of gateways. When a function block is loaded into a gateway, the function block's icon appears in the online gateway section 1006. The icon's appearance can be based on the function block's execution state, redundancy role, and redundancy synchronization state.

As particular examples, the following features can be used in the icons. A small triangle next to an icon can distinguish online and offline configurations. A pair of gateway symbols can represent a redundant pair, where the left symbol denotes a primary gateway and the right symbol denotes a secondary gateway. Gray icons or grey and white icons can represent offline gateways, red icons can represent gateways with communication errors, yellow icons can represent gateways with unloaded configurations, and green icons can represent online gateways with loaded configurations. The letter "D" can indicate that a default configuration is being used, and orange circles can denote soft fails. Shadows can be used to identify missing partner gateways, and colors of the symbols may or may not match to indicate synchronization (or lack thereof) between partner gateways.

When a user chooses to create or edit a function block for a gateway, a GUI 1100 as shown in FIG. 11 could be presented to the user. The GUI 1100 includes tabs 1102, which allow the user to view and edit different information associated with the configuration of a gateway. In this example, a "Main" tab 1102 has been selected, causing the GUI 1100 to display the information in FIG. 11. This information includes general gateway information, 1104, such as the gateway's name, wired network address, and image version. The GUI 1100 also allows the user to issue a command to the gateway using a drop-down menu 1106.

The GUI 1100 also includes state information 1108, which identifies various states or modes of the gateway. The state information 1108 here includes whether the gateway is operational (gateway state), a redundancy role of the gateway, and a synchronization state of the gateway. The GUI 1100 further includes redundancy configuration information 1110, which identifies information about a redundant partner gateway (if any). The redundancy configuration information 1110 here includes a checkbox indicating whether the gateway is part of a redundant pair and, if checked, the name and wired address of the partner gateway. The name could be automatically generated, such as by adding a "SEC" suffix to a primary gateway's name.

In addition, the GUI 1100 includes an advanced options section 1112 and wireless network information 1114. The advanced options section 1112 allows the user to configure various options of the gateway, such as the number of times a wireless transmission is retried, whether a default wireless configuration is used, and whether certain interfaces are enabled. The wireless network information 1114 identifies various wireless parameters of the gateway, such as its wireless network address.

When a "Redundancy" tab 1102 is selected, the GUI 1100 shows the information in FIG. 12. In this example, the GUI 1100 includes redundancy status information 1202, which includes an auto-synchronization state and a redundancy compatibility (such as the current state of the switchover state machine 700). The redundancy status information 1202 also includes a reason why synchronization has been inhibited (if any) and a progress of an initial synchronization. The redundancy status information 1202 further includes a last synchronization time, a time of a last loss of synchronization, and a redundancy controllability (whether redundancy parameters can be controlled). The GUI 1100 also includes various redundancy statistics 1204.

The GUI 1100 further includes buttons 1206, which can be used to invoke various functions. These functions include enabling and disabling synchronization. These functions also include initiating a switchover in role or becoming a primary gateway. In addition, the GUI 1100 includes a redundancy history 1208, which identifies different redundancy-related events that have occurred and when (and possibly explanations for the events).

Once a gateway function block is defined, it can be loaded into a gateway. Before loading a function block, the gateway can be "keyed" by providing appropriate encryption keys to the gateway. At that point, a gateway function block can be loaded into the gateway, and the gateway can begin functioning in accordance with the loaded function block. The same procedure can be used to configure and load function blocks in both primary and secondary gateways in a redundant configuration.

The GUI 1100 can be used to configure a primary or secondary gateway. In the case of a secondary gateway, the user may not be given the option of altering the redundancy configuration information 1110, though. The same or similar interfaces can also be used to convert a redundant gateway into a non-redundant gateway or vice versa. The same or similar interfaces can further be used to promote a "lonely unsynchronized" secondary gateway (a secondary gateway that has lost its primary partner) to the primary role. Any other or additional functions related to redundant or non-redundant gateways could be supported by one or more GUIs.

Although FIGS. 10 through 12 illustrate examples of GUIs for configuring redundant gateways and other gateways, various changes may be made to FIGS. 10 through 12. For example, any other or additional graphical user interfaces could be used to collect information related to and configure gateways from one or more users.

Figure 13:
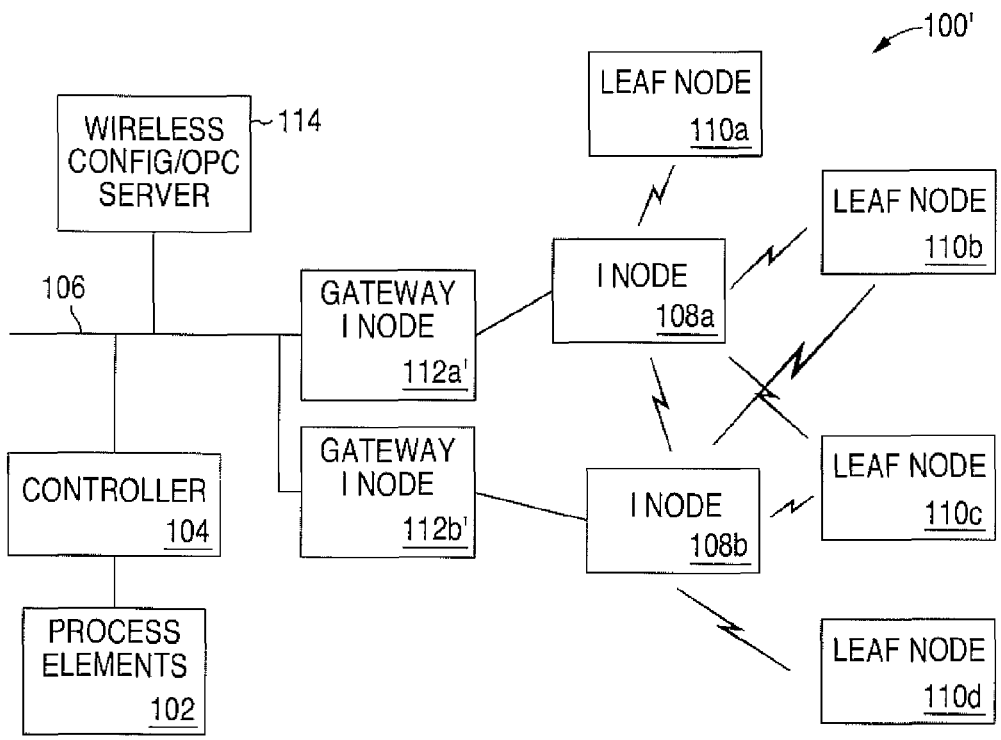
FIG. 13 illustrates another example process control system supporting the use of redundant gateways according to this disclosure.

FIG. 13 illustrates another example process control system 100' supporting the use of redundant gateways according to this disclosure. In this example embodiment, the system 100' is similar to the system 100 shown in FIG. 1. However, in FIG.

13, the redundant gateway infrastructure nodes 112a'-112b' are in wired connection to the infrastructure nodes 108a-108b, respectively.

In this embodiment, the gateway infrastructure nodes 112a'-112b' do not engage in wireless communications themselves. Rather, the gateway infrastructure nodes 112a'-112b' transmit data to and receive data from the infrastructure nodes 108a-108b, which can communicate wirelessly. In these types of embodiments, the gateway infrastructure nodes 112a'-112b' could have the structure shown in FIG. 3 and described above, except the transceiver(s) 308 and antenna(s) 308 could be replaced by one or more wired transceivers (such as Ethernet, serial, or other transceivers).

Even though the gateway infrastructure nodes 112a'-112b' do not themselves communicate wirelessly, the gateway infrastructure nodes 112a'-112b' can still maintain the secure communication sessions and encryption keys used to communicate with wireless devices like leaf nodes. As a result, synchronizing the gateway infrastructure nodes 112a'-112b' with each other still allows the secondary gateway to assume the primary role when the primary gateway fails or otherwise becomes unavailable.

As can be seen here, this provides redundant gateway nodes with a wide range of possible uses. This includes use in systems where adequate radio coverage exists and no additional wireless coverage need by provided by the redundant gateway nodes.

Although FIG. 13 illustrates another example of a process control system 100' supporting the use of redundant wireless gateways, various changes may be made to FIG. 13. For example, the system 100' could include any number of components, and various components could be combined, subdivided, or omitted and additional components could be added according to particular needs. Also, the use of redundant wireless gateways can be supported in any other suitable system.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   determining whether a first gateway is capable of operating as a redundancy for a second gateway based on whether the first gateway includes configuration information in a system status pages (SSP) file, whether the first gateway is able to initialize the SSP file from non-volatile memory, and whether at least one network address for the first gateway has been changed;
   in response to determining that the first gateway is capable of operating as the redundancy for the second gateway, synchronizing the first gateway with information from the second gateway, the second gateway operating in a primary role with at least one primary network address, the second gateway communicating with at least one wireless device that uses at least one encryption key during at least one secure communication session, the information including the at least one encryption key;
   detecting a switchover event at the first gateway; and
   in response to detecting the switchover event:
      switching the first gateway to the primary role and communicating using the at least one primary network address; and
      maintaining the at least one secure communication session at the first gateway after the first gateway switches to the primary role.

2. The method of claim 1, further comprising:
   prior to detecting the switchover event, operating the first gateway in a secondary role; and
   using at least one secondary network address when the first gateway is in the secondary role.

3. The method of claim 2, further comprising:
   after the second gateway begins operating in the secondary role, transmitting information from the first gateway to the second gateway for synchronization of the second gateway with the first gateway.

4. The method of claim 1, further comprising:
   determining an initial role for the first gateway, the initial role based on at least one of: a previous role of the first gateway, an availability of the at least one primary network address, and an indication whether the first gateway was previously synchronized with the second gateway.

5. The method of claim 1, wherein switching the first gateway to the primary role comprises the first gateway:
   using a primary wired network address and a primary wireless network address; and
   using secure communication channels previously established by the second gateway.

6. The method of claim 1, wherein the switchover event comprises at least one of:
   a switchover command from a user;
   a switchover command from the second gateway; and
   a failure of communication with the second gateway.

7. The method of claim 1, further comprising:
   configuring one or more function blocks defining at least part of operation of the first and second gateways; and loading the one or more function blocks into the first and second gateways.

8. The method of claim 1, wherein synchronizing the first gateway with information from the second gateway comprises:
  opening a first socket at the first gateway;
  binding the first socket to an interface on a port;
  setting the first socket to a listening mode; and
  in response to identifying a connection from the second gateway, accepting the connection of the first socket to a second socket of the second gateway.

9. A gateway comprising:
  at least one transceiver configured to communicate with a second gateway; and
  at least one processing device configured to:
    determine whether the gateway is capable of operating as a redundancy for the second gateway based on whether the gateway includes configuration information in a system status pages (SSP) file, whether the gateway is able to initialize the SSP file from non-volatile memory, and whether at least one network address for the gateway has been changed;
    synchronize, in response to determining that the gateway is capable of operating as the redundancy for the second gateway, the gateway with information from the second gateway, the second gateway configured to operate in a primary role with at least one primary network address, the second gateway configured to communicate with at least one wireless device that uses at least one encryption key during at least one secure communication session, the information including the at least one encryption key;
    detect a switchover event at the gateway; and
    in response to detecting the switchover event:
      switch the gateway to the primary role and begin communicating using the at least one primary network address; and
      maintain the at least one secure communication session at the gateway after the gateway switches to the primary role.

10. The gateway of claim 9, wherein the at least one processing device is further configured to:
  operate the gateway in a secondary role prior to detecting the switchover event; and
  use at least one secondary network address when the gateway is in the secondary role.

11. The gateway of claim 10, wherein the at least one processing device is further configured to:
  initiate transmission of information from the gateway to the second gateway for synchronization of the second gateway with the gateway after the second gateway begins operating in the secondary role.

12. The gateway of claim 9, wherein the at least one processing device is further configured to:
  determine an initial role for the gateway, the initial role based on at least one of: a previous role of the gateway, an availability of the at least one primary network address, and an indication whether the gateway was previously synchronized with the second gateway.

13. The gateway of claim 9, wherein the at least one processing device is configured to switch the gateway to the primary role by:
  using a primary wired network address and a primary wireless network address; and
  using secure communication channels previously established by the second gateway.

14. The gateway of claim 9, wherein the switchover event comprises at least one of:
  a switchover command from a user;
  a switchover command from the second gateway; and
  a failure of communication with the second gateway.

15. The gateway of claim 9, wherein the at least one processing device is further configured to receive one or more function blocks defining at least part of operation of the gateway.

16. A non-transitory computer readable medium embodying a computer program, the computer program comprising computer readable program code for:
  determining whether a first gateway is capable of operating as a redundancy for a second gateway based on whether the first gateway includes configuration information in a system status pages (SSP) file, whether the first gateway is able to initialize the SSP file from non-volatile memory, and whether at least one network address for the first gateway has been changed;
  synchronizing, in response to determining that the first gateway is capable of operating as the redundancy for the second gateway, the first gateway with information from the second gateway, the second gateway configured to operate in a primary role with at least one primary network address, the second gateway configured to communicate with at least one wireless device that uses at least one encryption key during at least one secure communication session, the information including the at least one encryption key;
  detecting a switchover event at the first gateway; and
  in response to detecting the switchover event:
    switching the first gateway to the primary role and communicating using the at least one primary network address; and
    maintaining the at least one secure communication session at the first gateway after the first gateway switches to the primary role.

17. The computer readable medium of claim 16, further comprising computer readable program code for:
  operating the first gateway in a secondary role prior to detecting the switchover event; and
  using at least one secondary network address when the first gateway is in the secondary role.

18. The computer readable medium of claim 17, further comprising computer readable program code for:
  transmitting information from the first gateway to the second gateway for synchronization of the second gateway with the first gateway after the second gateway begins operating in the secondary role.

19. The computer readable medium of claim 16, further comprising computer readable program code for:
  determining an initial role for the first gateway, the initial role based on at least one of: a previous role of the first gateway, an availability of the at least one primary network address, and an indication whether the first gateway was previously synchronized with the second gateway.

20. The computer readable medium of claim 16, wherein the computer readable program code for switching the first gateway to the primary role comprises computer readable program code for:
  using a primary wired network address and a primary wireless network address; and
  using secure communication channels previously established by the second gateway.

21. The computer readable medium of claim 16, wherein the switchover event comprises at least one of:

a switchover command from a user;
a switchover command from the second gateway; and
a failure of communication with the second gateway.

22. The computer readable medium of claim 16, wherein the computer readable program code for synchronizing the first gateway with information from the second gateway comprises computer readable program code for:
opening a first socket at the first gateway;
binding the first socket to an interface on a port;
setting the first socket to a listening mode; and
accepting, in response to identifying a connection from the second gateway, the connection of the first socket to a second socket of the second gateway.

* * * * *